No. 669,940.  
Patented Mar. 12, 1901.
F. M. GILBERT & G. K. WHEELER.
RECTIFIER FOR ELECTRIC CURRENTS.
(Application filed Dec. 17, 1898.)
(No Model.)
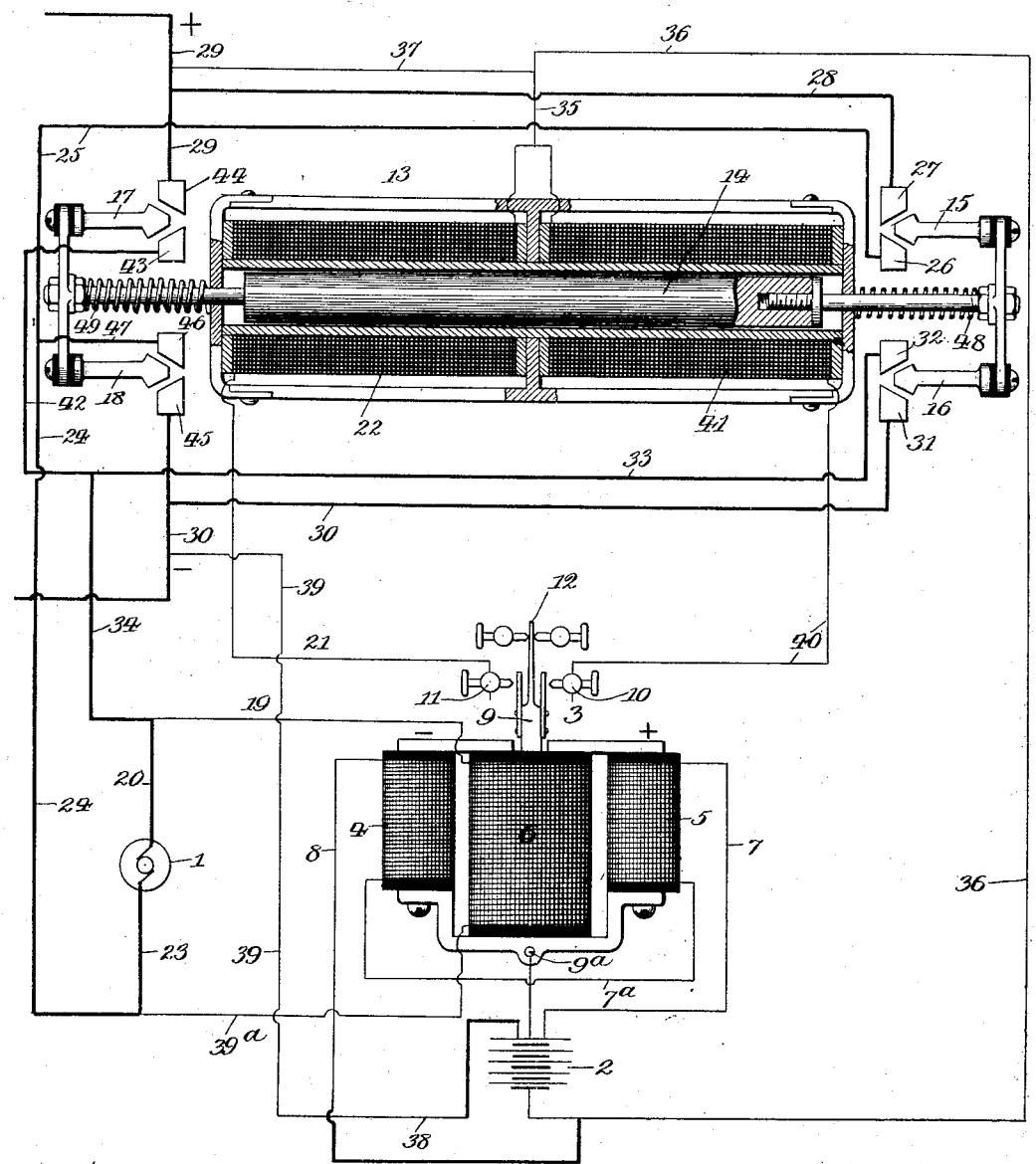
Witnesses:
Inventors:  
Franklin M. Gilbert  
George K. Wheeler  
By Banning & Banning & Sheridan  
Attys.

UNITED STATES PATENT OFFICE.

FRANKLIN M. GILBERT, OF ST. PAUL, MINNESOTA, AND GEORGE K. WHEELER, OF TOPEKA, KANSAS, ASSIGNORS TO THE ELECTRIC AXLE LIGHT & POWER COMPANY, OF NEW YORK, N. Y.

RECTIFIER FOR ELECTRIC CURRENTS.

SPECIFICATION forming part of Letters Patent No. 669,940, dated March 12, 1901.

Application filed December 17, 1898. Serial No. 699,573. (No model.)

*To all whom it may concern:*

Be it known that we, FRANKLIN M. GILBERT, residing at St. Paul, in the county of Ramsey and State of Minnesota, and GEORGE K. WHEELER, residing at Topeka, in the county of Shawnee and State of Kansas, citizens of the United States, have invented a certain new and useful Improvement in Rectifiers for Electric Currents, of which the following is a specification.

This invention relates to that class of rectifiers which are used in connection with a system for distributing electric current and which is known as "automatic" rectifiers for electric current.

The object of the invention is to provide a simple, economical, and efficient rectifier for electric current; and the invention consists principally in the combination of a solenoid provided with a winding at or near each end, a core extending through the solenoid, and contacts adapted to be opened and closed by the movements of the core.

The invention consists, further, in the combination of a solenoid provided with a winding at or near each end, a core extending through the solenoid, contacts arranged in pairs at or near each end of the solenoid and adapted to be connected and disconnected by the movements of the core, and means for normally holding the core out of engagement with the contacts when the solenoid is deënergized.

The invention consists, finally, in the features, combinations, and details of construction hereinafter described and claimed.

The accompanying drawing represents in diagrammatic form our invention as applied to a system for distributing and rectifying electric current.

This invention is intended to be adapted for use in connection with systems for generating and distributing electric current in which a dynamo is arranged to be rotated in either direction. In this art it is well known that when the generator, in the shape of a dynamo, is revolving in one direction with a constant current and when used in connection with secondary batteries if it be revolved in another direction the current will enter the batteries and destroy the same, or current is likely to flow from the batteries to reverse the dynamo and tend to run it as a motor or destroy the machine unless promptly changed and rectified so that it will flow in one direction only.

In constructing our improvement we provide a generator 1 in the shape of a dynamo and which is arranged to be rotated in either direction.

In order to provide for the flow of current in one direction only to the point of use and to the secondary batteries 2, we provide a polarized relay 3, which has three spools 4, 5, and 6, the outside spools of which are connected by means of the wires 7 and 8 with the battery and by means of the wire $7^a$ with each other, so that they are in a practical sense permanent magnets. The third or center spool 6 is located between these spools and connected with the dynamo-terminals, as hereinafter set forth, so that when current flows in one direction or the other the central spool is energized and in connection with one or the other of the outside spools attracts the armature 9, which is pivoted at $9^a$ and held midway between two contacts 10 and 11 by means of the spring 12, so as to close the circuit on the one side or the other of such magnet and permit current to flow from the generator to the switch-solenoid 13 or to one side thereof, so that its core 14 is drawn in the one direction or the other to close the double-pole switches 15 and 16 on the one side or 17 and 18 on the other side, all of which will more fully hereinafter appear, and maintain a flow of current to the batteries and main line in one direction only.

Suppose the secondary batteries to be energizing the outside spools of the polarized relay and the generator started, so that it builds up and by means of the shunt formed by the wire 19, which leads from the main wire 20 to the central spool of the polarized relay, so as to energize it positively, draws its armature over against contact 11. Current would then flow through the shunt-wire 21 to the winding 22 of the solenoid and energizing such solenoid would draw its core over, so as to close the double-pole switch 15 and 16 and connect their contacts in pairs. Current would then flow from the generator through wires 23, 24, and 25 to the contact 26, switch 15, contact 27, and wire 28 out to the main 29. After performing its work it would return through the main 30 to contact 31, switch 16, contact 32, and wires 33, 34, and 20 back to the generator. The shunt-circuit is completed by current flowing from the coil 22 through wires 35 and 36 to the batteries.

To use the current for charging the secondary batteries so that it will receive current in one direction only and at all times when the generator is being operated, current flows from the main 29 through wires 37 and 36 to battery 2 and from the battery through wires 38 and 39 to the main 30.

Supposing the generator to have ceased operating in the direction above indicated and from any cause whatsoever to be rotated in the opposite direction, potential builds up so that current flows through wires 23 and 39ª to the central spool 6 of the polarized relay to energize it in the opposite direction. The magnetism of its armature is therefore reversed and it is attracted toward solenoid 5 and in consequence makes contact with terminal 10. Current will then flow through wire 40 to the opposite winding 41 of the switch-solenoid and from such winding will complete the shunt-circuit through wires 35 and 36 back to the battery. This action energizes the solenoid, so that the core is moved to close the double-pole switch 17 and 18 and connect their contacts in pairs. The main circuit is then closed, so that current will flow from the generator through wires 20, 34, and 42 to contact 43, through switch 17, contact 44, and out through the main line 29. After passing through the external circuit it flows back through the main 30, contact 45, switch 18, contact 46, and wires 47, 24, and 23 back to the generator.

The current is taken off as before for charging the secondary batteries from the main 29 through wires 37 and 36 to the battery and from the batteries through wires 38 and 39 to the main 30, though it will be understood, of course, that this surplus energy may be used for operating lights or other electric apparatus.

It will be seen from the foregoing that current furnished the main line and batteries flows in one direction only.

An examination of the drawing will show that the core of the solenoid is held normally between and out of engagement with both sets of contacts by means of the springs 48 and 49, so that the work to be performed by the magnetic action of the solenoid will be minimized and to keep them out and prevent building of dynamo-fields in improper directions.

While we have described our invention with more or less minuteness as regards details of construction and arrangement, we do not desire to be limited thereto unduly or any more than is pointed out in the claims. On the contrary, we contemplate all proper changes in construction and arrangement, the omission of immaterial elements, and the substitution of equivalents, as circumstances may suggest or necessity render expedient.

We claim—

1. In a system of electrical distribution, the combination with a dynamo, a storage battery and a consumption-circuit, of multiple terminals for said consumption-circuit, a relay having one of its circuits permanently energized from said storage battery, and a double-solenoid circuit-controller electrically controlled from said relay normally engaged with one set of said terminals of said consumption-circuit, substantially as described.

2. The combination with a dynamo, storage battery and a consumption-circuit, of a current-rectifier consisting of a double solenoid, a core for said solenoid movable in axial and opposite directions by magnetic action, two sets of contacts mounted on and carried by said core, two sets of terminals connected to said dynamo and said consumption-circuit in proximity and in the path of said two sets of contacts, a relay electrically connected with the dynamo, the storage battery and said double solenoid, and an oscillatory armature for said relay for engaging some of the electrical connections of said double solenoid, substantially as described.

FRANKLIN M. GILBERT.
GEORGE K. WHEELER.

Witnesses to the signature of Franklin M. Gilbert:
ALEX. R. SPEEL,
CHAS. CONRADIS.

Witnesses to the signature of George K. Wheeler:
GEO. C. F. ROBERTS,
J. B. SIAS.